(12) United States Patent
Ouchi et al.

(10) Patent No.: US 6,510,869 B1
(45) Date of Patent: Jan. 28, 2003

(54) BALL CHECK VALVE

(75) Inventors: Kiyoshi Ouchi, Tokyo (JP); Masaru Sato, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/720,264

(22) PCT Filed: Jun. 30, 1999

(86) PCT No.: PCT/JP99/03525

§ 371 (c)(1),
(2), (4) Date: Feb. 21, 2001

(87) PCT Pub. No.: WO00/03168

PCT Pub. Date: Jan. 20, 2000

(30) Foreign Application Priority Data

Jul. 10, 1998 (JP) .......................................... 10-211906
Jul. 10, 1998 (JP) .......................................... 10-211907

(51) Int. Cl.$^7$ ............................................... F16K 15/04
(52) U.S. Cl. ............................... 137/533.15; 137/533.11
(58) Field of Search ..................... 137/533.11, 533.13, 137/533.15, 375; 454/359; 251/368

(56) References Cited

U.S. PATENT DOCUMENTS

| 841,474 | A | * | 1/1907 | Wendelkin | ............. | 137/533.11 |
| 2,103,427 | A | * | 12/1937 | Long | ................. | 137/533.11 X |
| 2,391,852 | A | * | 12/1945 | Winton | ............... | 137/533.11 X |
| 2,652,849 | A | * | 9/1953 | Ebbs et al. | ......... | 137/533.11 X |
| 2,884,223 | A | * | 4/1959 | Cooksley | ............ | 137/533.11 X |
| 4,263,936 | A | * | 4/1981 | Brown | ....................... | 137/496 |
| 4,501,292 | A | * | 2/1985 | Maloblocki | ............ | 137/533.11 |
| 4,624,176 | A | * | 11/1986 | Steinke | ........................ | 454/359 |
| 4,662,392 | A | * | 5/1987 | Vadasz | .................. | 137/533.11 |
| 4,687,023 | A | * | 8/1987 | Harbison et al. | ...... | 137/533.13 |
| 5,509,445 | A | * | 4/1996 | Couet | ..................... | 137/533.11 |
| 5,709,242 | A | * | 1/1998 | Bergen | .................. | 137/533.11 |
| 6,024,121 | A | * | 2/2000 | Anderson | ................... | 137/542 |

FOREIGN PATENT DOCUMENTS

| DE | 1057840 | * | 4/1957 | ............. | 137/533.11 |
| FR | 2351333 | * | 5/1976 | ............. | 137/533.11 |
| JP | 14-5236 | | 4/1939 | | |
| JP | 25-6846 | | 9/1950 | | |
| JP | 51-004097 | | 2/1976 | | |
| JP | 62-073171 | | 5/1987 | | |
| JP | 2-041400 | | 11/1990 | | |
| JP | 6-20754 | | 3/1994 | | |
| JP | 9-032953 | | 2/1997 | | |
| JP | 2545929 | | 5/1997 | | |

* cited by examiner

*Primary Examiner*—John Rivell
(74) *Attorney, Agent, or Firm*—Oblon, Spivak, McClelland, Maier & Neustadt, P.C.

(57) ABSTRACT

The present invention provides a ball check valve in which the area of a channel leading from a ball chamber to a discharge-side channel can be increased, and the adhesion of a ball to a valve seat surface is satisfactory even when the ball check valve is used in a horizontal posture. In the ball check valve having a ball (3) movably housed in a ball chamber (2) provided inside a valve casing (1), two or more rail-like ridges (13) protruding toward the interior of the ball chamber to guide the ball (3) are provided on a peripheral wall (10) demarcating the ball chamber (2). Furthermore, valve seats (20*a*, 20*b*) constituted separately from the valve casing (1) are mounted, respectively, on the inflow side and the discharge side of the valve casing (1).

7 Claims, 5 Drawing Sheets

BALL CHECK VALVE

TECHNICAL FIELD

This invention relates to a ball check valve preferred for use in devices related to sewage treatment.

BACKGROUND ART

The configuration of a conventional general ball check valve used, for example, in devices related to sewage treatment is shown in FIGS. 1 and 2. As shown in these drawings, a ball 3 is movably housed in a ball chamber 2 provided inside a valve casing 1. A cover 4 is attached watertight to the valve casing 1 by bolts 6 via an O-ring 5. The valve casing 1 is provided with an inflow port 7 and a discharge port 8, which are open to the outside. Inside the valve casing 1, a valve seat surface 9 and a ball guide portion 10 are formed. The ball guide portion 10 is formed along an opening portion 12 which is provided in a peripheral wall demarcating the ball chamber 2 so as to be open to a discharge-side channel 11 leading to the discharge port 8. A fluid flows into the valve casing 1 from the direction of an arrow I, and is discharged to the outside in the direction of an arrow O.

When a pump is operated to exert pressure on the inflow port 7, the ball 3 departs from the valve seat surface 9, and moves in the ball chamber 2 along the ball guide portion 10 in the direction of an arrow m. When the pump stops, the ball 3 falls to the valve seat surface 9 by its own weight to prevent a back flow.

With the foregoing conventional ball check valve, however, when the ball 3 moves along the ball guide portion 10, a part of the ball 3 is jammed in the discharge-side channel 11, as shown in FIG. 2. As a result, the area of a channel from the ball chamber 2 to the discharge-side channel 11 decreases to increase the fluid resistance. On the other hand, the ball check valve may be turned 90 degrees, and used in a horizontal posture, with the cover 4 facing upward. In this case, the ball 3 undergoes the force of the fluid, and can freely rotate in directions parallel to, and perpendicular to, the flow of the fluid. Thus, when the ball 3 rests on the valve seat surface 9, the ball 3 easily rotates on the valve seat surface 9 in the circumferential direction of the valve seat surface 9, resulting in poor adhesion of the ball 3 to the valve seat surface 9.

With the above-described conventional ball check valve, moreover, the valve casing 1 is either produced, for example, by integral molding of resin, or has its inner peripheral surface coated with resin, in consideration of corrosion resistance, etc. To hold the ball 3, which is inserted into the ball chamber 2, so as to be inescapable, the cover 4 constituted separately from the valve casing 1 is provided. Furthermore, the ball 3 is generally constituted by integrally covering the surface of a spherical, metallic core material 15 with an elastic body 16.

However, with the above conventional ball check valve, the valve seat surface 9 is formed inside the valve casing 1, so that the internal diameter of the inflow port 7 and the discharge port 8 cannot be made greater than the external diameter of the ball 3. If the opening areas of the discharge-side channel 11 and the opening portion 12 open to the discharge-side channel 11 are made larger than that of the discharge port 8, release of the mold at the time of molding poses a problem, and is considerably difficult.

Hence, certain limitations are imposed on the opening areas of the discharge-side channel 11 and the opening portion 12 open to the discharge-side channel 11. Besides, if the ball 3 is positioned at the opening portion 12, the ball 3 clogs a part of the opening portion 12, further decreasing the opening area. Thus, clogging with foreign objects tends to occur, and the fluid resistance increases. In addition, the valve seat surface 9 tends to wear, compared with the other portions, because of collision with the ball 3. If such wear occurs in the valve seat surface 9, replacement of the entire valve casing 1 is necessary, and it is uneconomical.

The elastic body 16 covering the surface of the ball 3 may peel, and the metallic core material 15 may be exposed to the outside. When this core material 15 contacts water, the core material 15 is selectively susceptible to corrosion, since the metal is generally electrochemically more ionizable than the surrounding resin. The use of a metal resistant to corrosion, for the purpose of preventing corrosion, leads to a high cost for the ball 3.

DISCLOSURE OF INVENTION

The present invention has been accomplished in light of the above problems. An object of the invention is to provide a ball check valve in which the area of a channel leading from a ball chamber to a discharge-side channel can be increased, and the adhesion of a ball to a valve seat surface is satisfactory even when the ball check valve is used in a horizontal posture.

Another object of the present invention is to provide a ball check valve in which an inner channel in a valve casing can be widened regardless of the size of the ball housed in the ball chamber, and even if an elastic body covering the surface of the ball peels, selective corrosion of a core material does not occur.

The ball check valve of the present invention is a ball check valve having a ball movably housed in a ball chamber provided inside a valve casing, characterized in that two or more rail-like ridges protruding toward the interior of the ball chamber to guide the ball are provided on a peripheral wall demarcating the ball chamber.

According to this feature, when the ball moves inside the ball chamber, the ball is guided by the rail-like ridges and situated more inwardly inside the ball chamber, and the area of a channel is correspondingly enlarged upwardly and downwardly of the ball. When the ball check valve is used in a horizontal posture, moreover, the free rotation of the ball in a direction perpendicular to the flow of a fluid is inhibited by the rail-like ridges, whereby the ball is prevented from rotating on the valve seat surface in a circumferential direction of the valve seat surface. Thus, the adhesion of the ball to the valve seat surface is improved.

The ball check valve is also characterized in that the rail-like ridges are disposed such that when the ball housed in the ball chamber contacts the peripheral wall of the ball chamber and the rail-like ridges, the center of gravity of the ball is positioned inwardly of the rail-like ridges.

According to this feature, even if the ball moves while deviating to one direction, the position of the ball is automatically corrected by a force acting on the ball to the normal position at which the ball is guided by the rail-like ridges. Since the position of the ball is so stabilized, the movement of the ball is smoothed.

The ball check valve of the present invention is also a ball check valve having a ball movably housed in a ball chamber provided inside a valve casing, characterized in that valve seats constituted separately from the valve casing are mounted, respectively, on an inflow side and a discharge side of the valve casing.

According to this feature, the valve seats mounted, respectively, on the inflow side and the discharge side of the valve casing form an inlet port and a discharge port having an internal diameter smaller than the external diameter of the ball housed inside the valve casing. Furthermore, the inner channel inside the valve casing can be widened in comparison with the internal diameter of the inflow port and the discharge port formed by the valve seats.

The ball check valve of the present invention is also a ball check valve having a ball movably housed in a ball chamber provided inside a valve casing, characterized in that the ball comprises a resinous core material having a surface coated with an elastic body.

According to this feature, even if the elastic body on the surface of the ball peels to bring the resinous core material into contact with water, the core material is prevented from selectively corroding, because the electrochemical stability of the core material is comparable to that of the surrounding resin. Furthermore, the ball can be produced for a low cost.

BEST MODE FOR CARRYING OUT THE INVENTION

Figure 1:
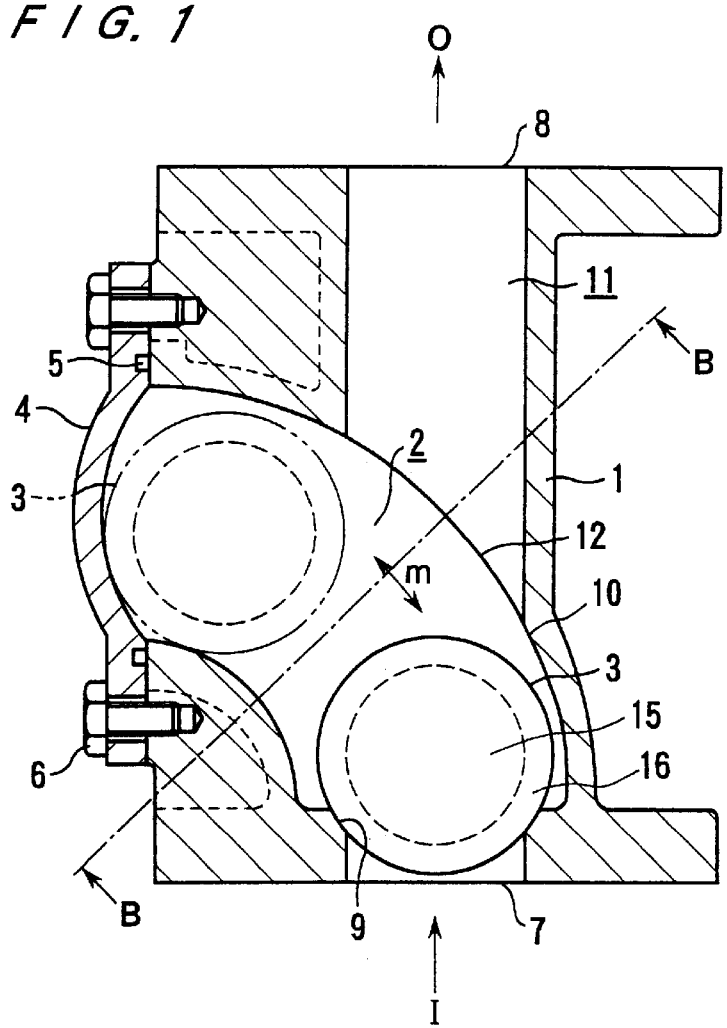
FIG. 1 is a vertical sectional front view showing a conventional ball check valve.
Figure 2:
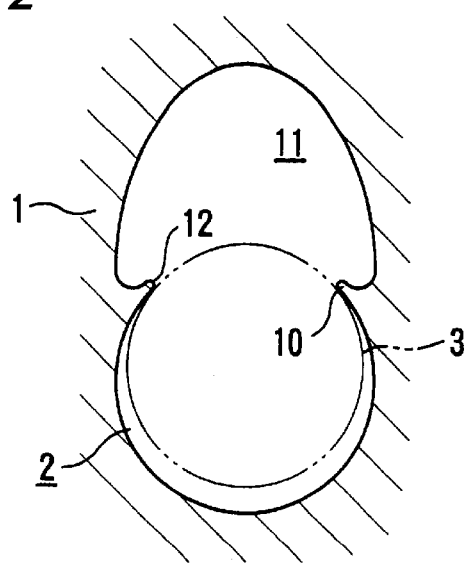
FIG. 2 is a sectional view taken on line B—B of FIG. 1.
Figure 3:
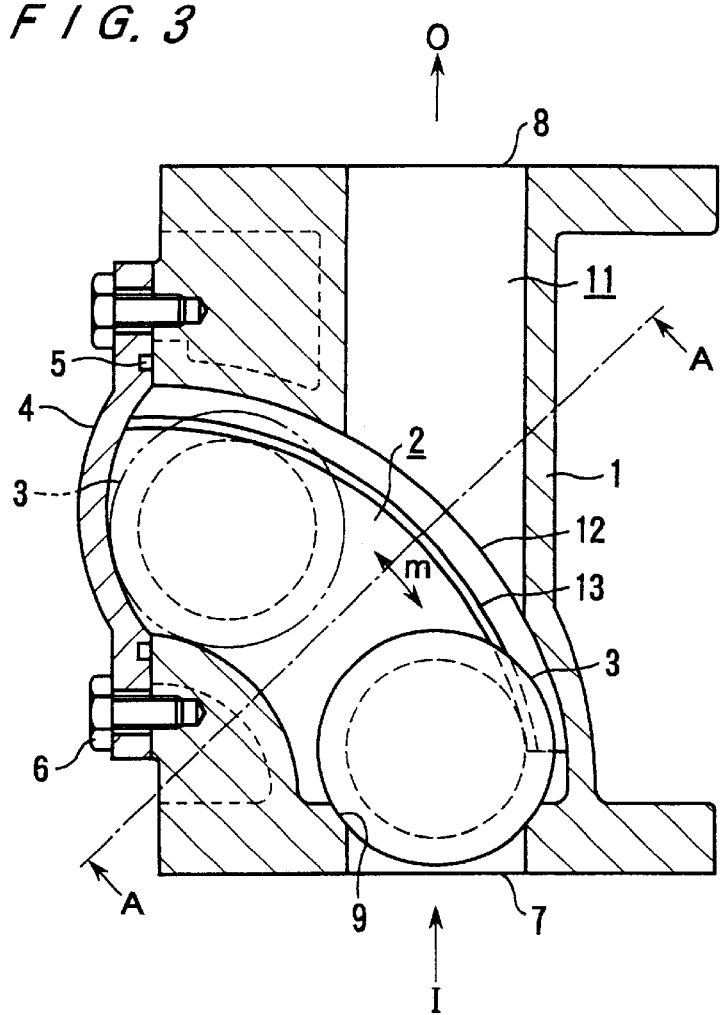
FIG. 3 is a vertical sectional front view showing a ball check valve according to a first embodiment of the present invention.

A ball check valve according to a first embodiment of the present invention will now be described with reference to FIGS. 3 to 5. The same members as in the conventional example shown in FIGS. 1 and 2 are assigned the same numerals for explanation.

The ball check valve of this embodiment is provided with a valve casing 1 housing a ball 3 movably in a ball chamber 2 provided inside. A cover 4 is attached watertight to the valve casing 1 by bolts 6 via an O-ring 5. The valve casing 1 is provided with an inflow port 7 and a discharge port 8, which are open to the outside. Inside the valve casing 1, a valve seat surface 9 is formed.

An opening portion 12 is provided in a peripheral wall demarcating the ball chamber 2 so as to be open to a discharge-side channel 11 leading to the discharge port 8. On both sides sandwiching the opening portion 12, a pair of rail-like ridges 13 are provided which protrude toward the interior of the ball chamber 2 and extend nearly throughout the length of the ball chamber 2.

When a pump is operated to exert pressure on the inflow port 7, the ball 3 departs from the valve seat surface 9, and moves in the ball chamber 2 along the rail-like ridges 13 in the direction of an arrow m. Upon this movement, a fluid flows into the valve casing 1 from the direction of an arrow I, and is discharged to the outside in the direction of an arrow O. When the pump stops, the ball 3 falls to the valve seat surface 9 under its own weight to prevent a back flow.

Figure 4:
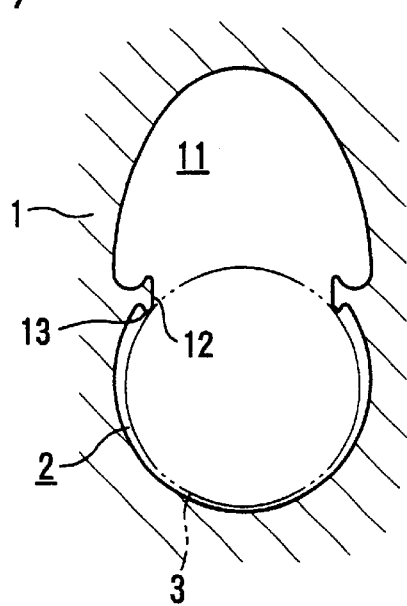
FIG. 4 is a sectional view taken on line A—A of FIG. 3.

When the ball 3 moves along the rail-like ridges 13 in the ball chamber 2, the movement of the ball 3 toward the discharge-side channel 11 is restrained by the rail-like ridges 13, as shown in FIG. 4. Thus, the ball 3 is situated more inwardly inside the ball chamber 2, namely, on a counter-discharge side apart from the discharge-side channel 11. As a result, spaces are correspondingly formed above and below the ball 3 to enlarge the area of the channel. When the ball check valve is used in a horizontal posture, moreover, the free rotation of the ball 3 in a direction perpendicular to the flow of the fluid is inhibited because of contact of the ball 3 with the rail-like ridges 13. Thus, when the ball 3 rests on the valve seat surface 9, the ball 3 is prevented from rotating on the valve seat surface 9 in a circumferential direction of the valve seat surface 9. Consequently, the adhesion of the ball 3 to the valve seat surface 9 is improved.

The rail-like ridges 13 are disposed such that when the ball 3 moves inside the ball chamber 2 while deviating to one direction, and contacts the peripheral wall of the ball chamber 2 and one of the rail-like ridges 13, the center of gravity, G, of the ball 3 is positioned inwardly of the rail-like ridges 13.

Figure 5:
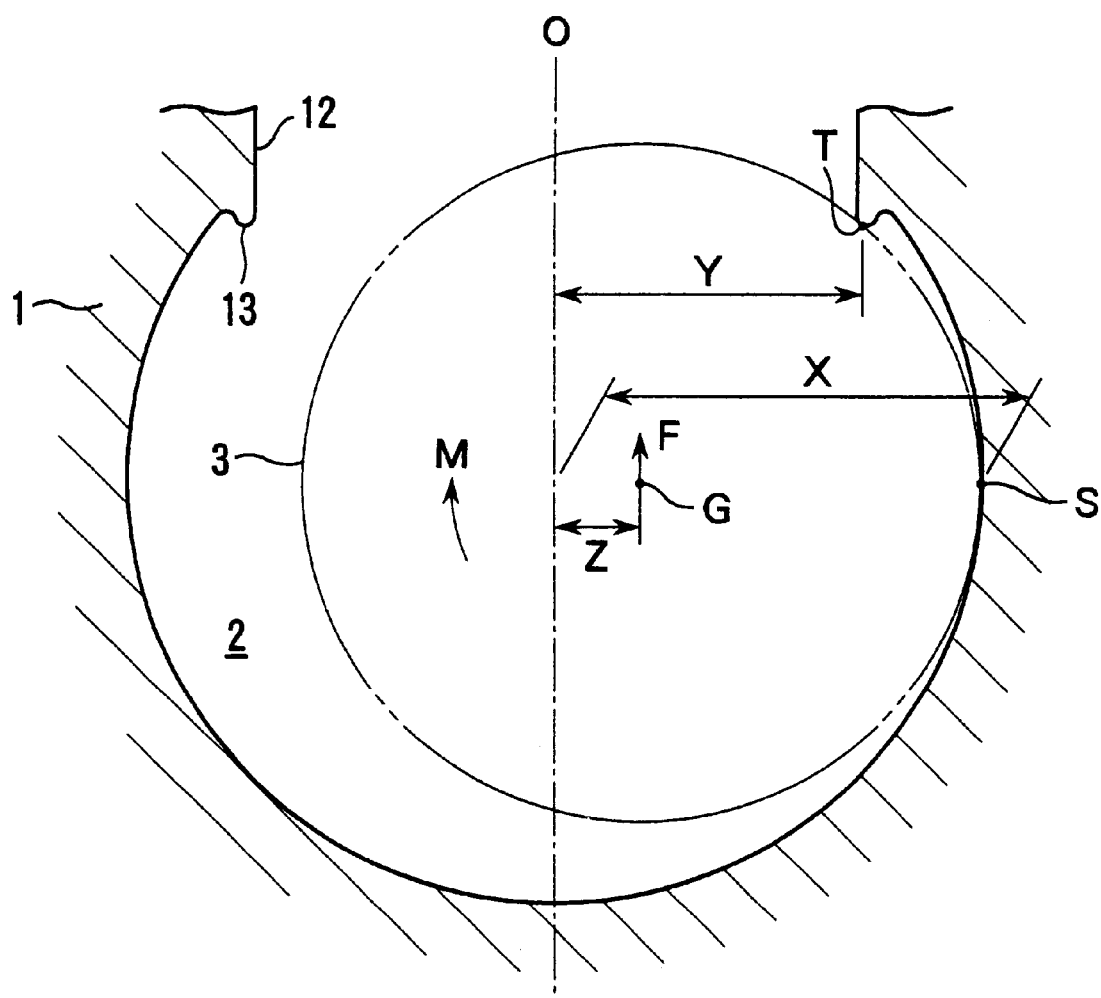
FIG. 5 is an enlarged view of an essential portion of FIG. 4.

As shown in FIG. 5, let the distance from the center line O of the ball chamber 2 to the point of contact S of the ball 3 with the peripheral wall of the ball chamber 2 be X, the distance from the center line 0 of the ball chamber 2 to the point of contact T of the ball 3 with the rail-like ridge 13 be Y, and the distance from the center line O of the ball chamber 2 to the center of gravity G of the ball 3 be Z. The distance X, the distance Y, and the distance Z are set to decrease in this order (X>Y>Z).

Because of this constitution, when the ball 3 moves along the peripheral wall of the ball chamber 2 and contacts one of the rail-like ridges 13, a force F acting on the center of gravity G of the ball 3 works as an upward moment M about the point of contact T of the ball 3 with the rail-like ridge 13. Hence, the position of the ball 3 is automatically corrected to a normal position present between the pair of rail-like ridges 13. As a result, the position of the ball 3 becomes stable, so that the movement of the ball 3 is smoothed.

As described above, when the ball moves inside the ball chamber, the ball is guided by the rail-like ridges and situated more inwardly inside the ball chamber, and the area of the channel is correspondingly enlarged upwardly and downwardly of the ball. Thus, the passage of foreign objects is improved, and the fluid resistance also decreases. When the ball check valve is used in a horizontal posture, moreover, the free rotation of the ball in a direction perpendicular to the flow of the fluid is inhibited by the rail-like ridges, whereby the ball is prevented from rotating on the valve seat surface in a circumferential direction of the valve seat surface. Thus, the adhesion of the ball to the valve seat surface is improved, and the operation of the valve becomes smooth.

The ball check valve is also designed as follows: Assume that the ball housed in the ball chamber moves along the peripheral wall of the ball chamber while deviating to a direction perpendicular to the flow of the fluid, and contacts the rail-like ridge. At this time, the center of gravity of the ball is located between the point of contact of the ball with the rail-like ridge and the center line of the ball chamber. Because of this feature, the position of the ball is automatically corrected to the normal position to stabilize the ball. Thus, the ball can be moved smoothly.

Figure 6:
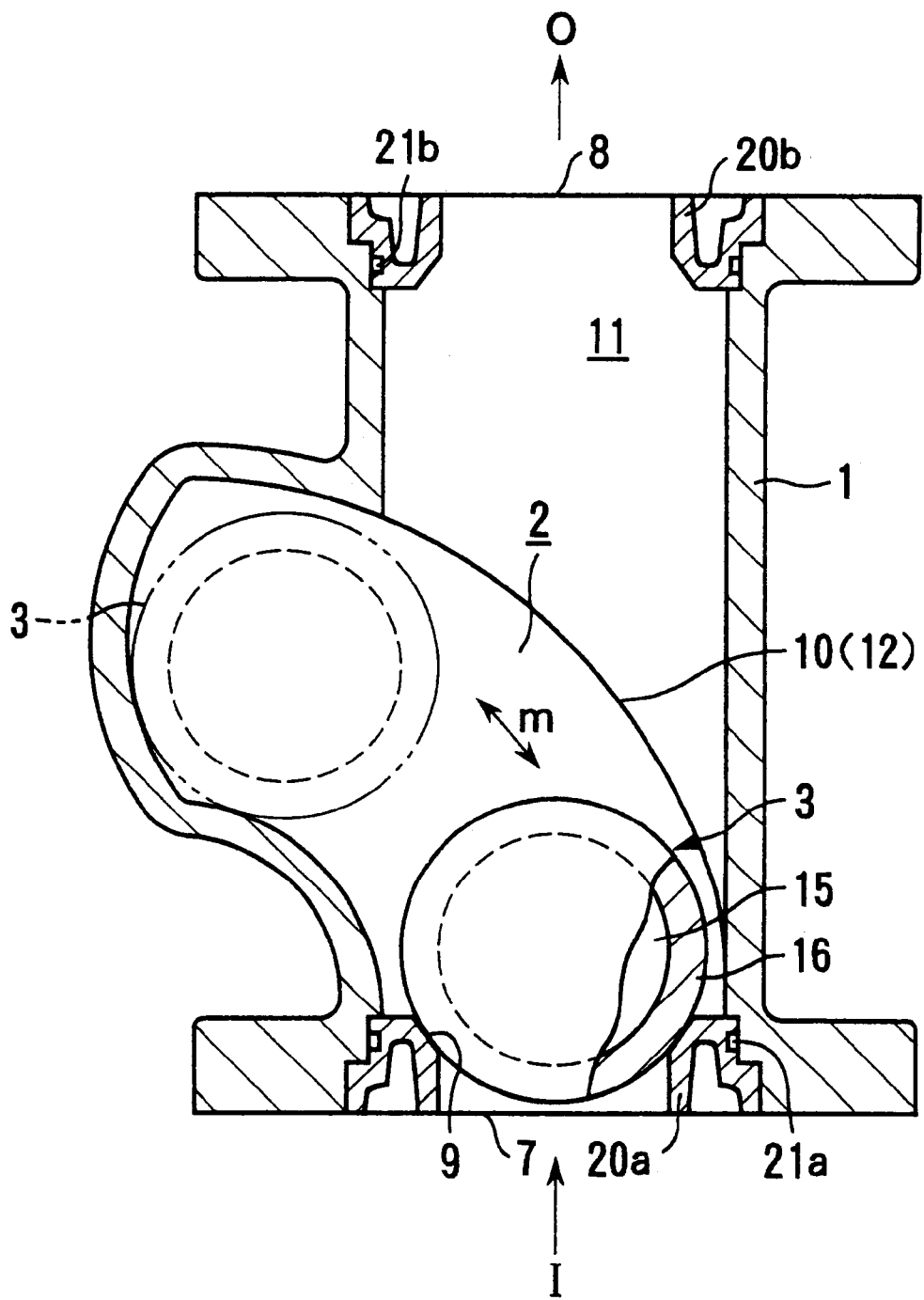
FIG. 6 is a vertical sectional front view showing a ball check valve according to a second embodiment of the present invention.

Next, a ball check valve according to a second embodiment of the present invention will be described with reference to FIG. 6. This ball check valve is provided with a valve casing 1 housing a ball 3 movably in a ball chamber 2 provided inside. The valve casing 1 is produced, for example, by integral molding of resin having excellent corrosion resistance, but may have an inner peripheral surface coated with resin.

On an inflow side of the valve casing 1, a valve seat 20a constituted separately from the valve casing 1 is mounted watertight via an O-ring 21a. An opening of the valve seat 20a constitutes an inflow port 7, while the side of the valve seat 20a that is opposite to the inflow port 7 constitutes a valve seat surface 9. On a discharge side of the valve casing 1, a valve seat 20b of the same configuration as described above is mounted watertight via an O-ring 21b. An opening of the valve seat 20b constitutes a discharge port 8.

Inside the valve casing 1, a discharge-side channel 11 leading to the discharge port 8 is formed. An opening portion 12 open to the discharge-side channel 11 is provided in a peripheral wall demarcating the ball chamber 2. A ball guide portion 10 is provided along the opening portion 12.

The internal diameter of the valve seats 20a, 20b is set to be smaller than the external diameter of the ball 3. By this measure, the inflow port 7 and the discharge port 8 having a smaller internal diameter than the external diameter of the ball 3 housed inside the valve casing 1 are formed at the valve seats 20a and 20b mounted, respectively, to the inflow side and the discharge side of the valve casing 1. The opening areas of the discharge-side channel 11 and the opening portion 12 open to the discharge-side channel 11 are set to be greater than that of the inflow port 7 and the discharge port 8 formed by the valve seats 20a, 20b.

According to the above configuration, the ball check valve has the inflow port 7 and the discharge port 8 having a smaller internal diameter than the external diameter of the ball 3. Even with such ball check valve, the valve casing 1, in which the opening areas of the discharge-side channel 11 and the opening portion 12 open to the discharge-side channel 11 are greater than that of the discharge port 8, can be produced with satisfactory moldability, with preventing the problem of release of the mold. Besides, the valve seat surface 9 tends to wear, compared with the other portions, because of collision with the ball 3. However, replacement of the valve seat 20a can be available, which is constituted separately from the valve casing 1, if wear occurs in the valve seat surface 9 thereon. Furthermore, the valve seats 20a and 20b of the same shape are provided on the inflow side and the discharge side of the valve casing 1, so that replacement of these valve seats also becomes possible.

When a pump is operated to exert pressure on the inflow port 7, the ball 3 departs from the valve seat surface 9, and moves in the ball chamber 2 along the ball guide portion 10 in the direction of an arrow m. On this occasion, a fluid flows into the valve casing 1 from the direction of an arrow I, and is discharged to the outside in the direction of an arrow O. The opening areas of the discharge-side channel 11 and the opening portion 12 open to the discharge-side channel 11 are large. Thus, even if the ball 3 clogs a part of the opening portion 12, a sufficient opening area is ensured to prevent clogging with foreign objects and an increase in the fluid resistance. When the pump stops, the ball 3 falls to the valve seat surface 9 by its own weight to prevent a back flow.

The ball 3 is constituted, for example, by coating the surface of a core material 15 of resin, such as polyvinyl chloride, with an elastic body 16. Thus, even if the elastic body 16 on the surface of the ball 3 peels to bring the resinous core material 15 into contact with water, the core material 15 is prevented from selectively corroding, because the electrochemical stability of the core material 15 is comparable to that of the surrounding resin. Furthermore, the ball 3 can be produced for a low cost.

Figure 7:
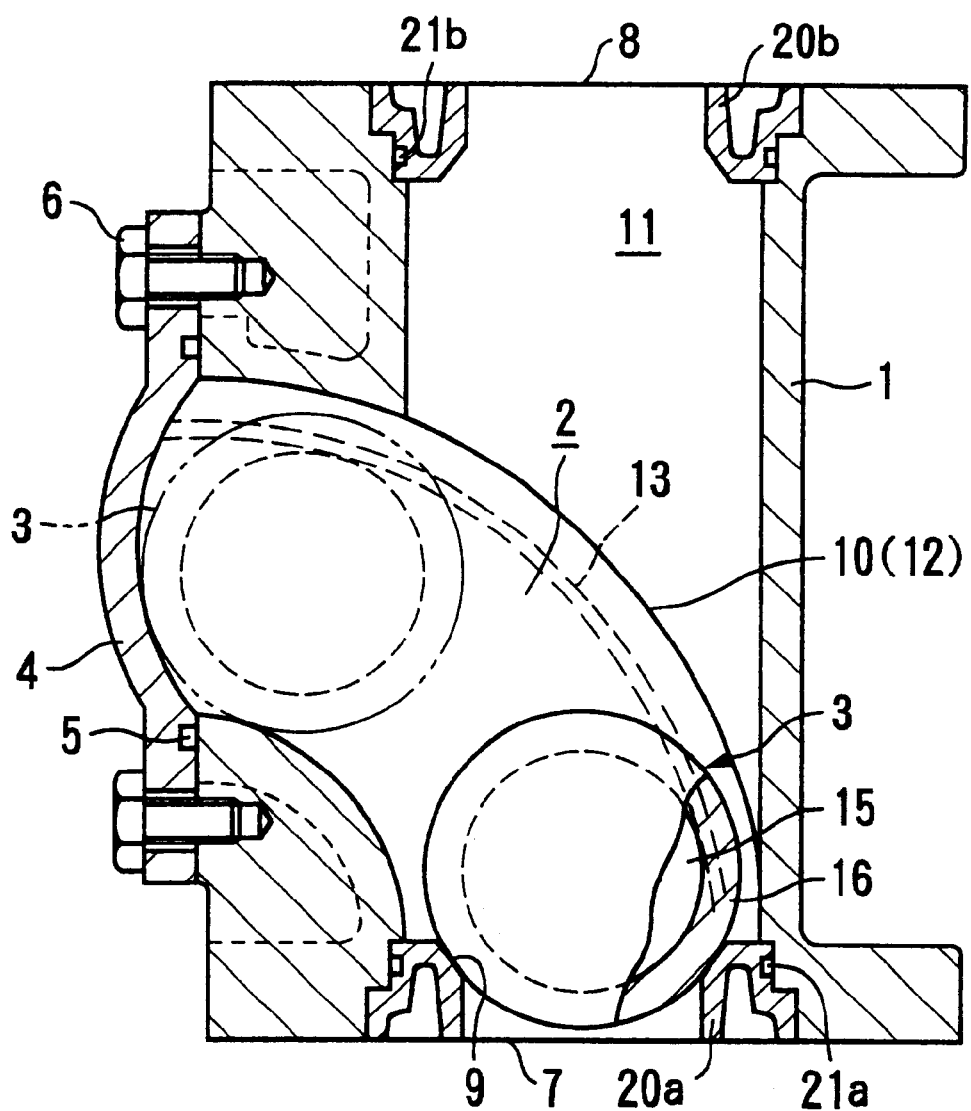
FIG. 7 is a vertical sectional front view showing a ball check valve according to a third embodiment of the present invention.

FIG. 7 shows a ball check valve according to a third embodiment of the present invention. With the ball check valve of this embodiment, like the conventional example shown in FIG. 1, a cover 4 is attached watertight to a valve casing 1 by bolts 6 via an O-ring 5, the valve casing 1 housing a ball 3 movably in a ball chamber 2 provided inside the valve casing 1. In the present embodiment, like the embodiment shown in FIG. 3, a pair of rail-like ridges 13 may be provided in a ball guide portion 10. Because of this feature, the movement of the ball is further stabilized, and the ball is situated inwardly inside the ball chamber. Thus, the problem of clogging of the opening portion 12 with the ball can be prevented, and the area of the channel is substantially enlarged. The valve casing 1 is either produced by integral molding of resin, or has its inner peripheral surface coated with resin. The other constitutions are the same as in the first embodiment.

According to the ball check valve of the present embodiment, the cover 4 is detached, and the ball 3 can be replaced, without the need to remove the check valve body from the piping. Thus, replacement of the ball 3 can be performed easily and promptly.

As described above, according to the present invention, the inner channel in the valve casing can be broadened, regardless of the size of the ball housed in the ball chamber. Hence, the influence of the decrease in the channel area by the ball is diminished to facilitate the passage of foreign objects and lower the fluid resistance. Furthermore, wearing-out of the valve seat surface, if any, can be easily dealt with by replacing only the valve seat.

Even if the elastic body on the surface of the ball peels to bring the core material into contact with water, the core material is prevented from selectively corroding, because the electrochemical stability of the core material is comparable to that of the surrounding resin. Furthermore, the ball can be produced for a low cost.

Industrial Applicability

The present invention relates to a check valve of a simple structure designed to prevent a back flow of a liquid current. The check valve is widely used, for example, in piping of sewage treatment facilities in combination with a pump for pressure feeding a liquid to be treated.

What is claimed is:

1. A ball check valve having a ball movably housed in a ball chamber provided inside a valve casing, said ball chamber having a curved structure in a direction perpendicular to a discharge-side channel leading to a discharge port from an inflow port, comprising:

an opening portion provided in a peripheral wall of said ball chamber for demarcating the ball chamber so as to be open to the discharge-side channel; and a pair of ridges protruding toward an interior of the ball chamber from the peripheral wall thereof so as to guide the ball;

wherein said pair of ridges is formed integrally with said peripheral wall so as to sandwich the opening portion at both sides of the opening.

2. The ball check valve of claim 1, wherein the ridges are disposed such that when the ball housed in the ball chamber contacts the peripheral wall of the ball chamber and the ridges, the ball is prevented from rotating on a valve seat surface in a circumferential direction of the valve seat surface.

3. The ball check valve of claim 1, wherein the ridges are disposed such that when the ball housed in the ball chamber, a center of gravity of the ball is positioned inwardly of the ridges.

4. The ball check valve of claim 1, wherein the peripheral wall of the ball chamber and the ridges protruded from the peripheral wall are formed by integrally molded resin having corrosion resistance.

5. The ball check valve of claim 1, wherein the peripheral wall of the ball chamber and the ridges protruded from the peripheral wall are formed by coating resin on an inner surface thereof.

6. A ball check valve having a ball movably housed in a ball chamber provided inside a valve casing, said ball chamber having a curved structure in a direction perpendicular to a discharge-side channel comprising:

an inflow port and a discharge port provided at both ends of the channel inside the valve casing, each of said ports having larger diameter than the diameter of the ball; and valve seats constituted separately from the valve casing, the valve seats being replacably mounted on the inflow port and the discharge port of the valve casing via O-ring seals, respectively; and a pair of ridges provided on a peripheral wall of the ball chamber and protruding toward an interior of the ball chamber to guide the ball.

7. A ball check valve of claim 6, wherein said ball comprises a resinous core material; and a surface coated with an elastic body around said core.

* * * * *

UNITED STATES PATENT AND TRADEMARK OFFICE
CERTIFICATE OF CORRECTION

PATENT NO.    : 6,510,869 B1
DATED         : January 28, 2003
INVENTOR(S)   : Ouchi et al.

It is certified that error appears in the above-identified patent and that said Letters Patent is hereby corrected as shown below:

<u>Title page,</u>
Item [86], should read:
-- [86] PCT No.:    PCT/JP99/03525
         § 371 (c)(1),
         (2), (4) Date:  Jan. 26, 2001 --

Signed and Sealed this

Third Day of June, 2003

JAMES E. ROGAN
*Director of the United States Patent and Trademark Office*